United States Patent [19]
Queffeulou

[11] 3,881,065
[45] Apr. 29, 1975

[54] DEVICE FOR ALIGNING DATA ENVELOPE FORMATS TO PCM WORD FORMATS

[76] Inventor: Jean-Yves Queffeulou, Route de Ploubezer, 22300 Lannion, France

[22] Filed: Mar. 7, 1974

[21] Appl. No.: 449,018

[30] Foreign Application Priority Data
Mar. 8, 1973 France .............................. 73.08354

[52] U.S. Cl. .......................... 179/15 BS; 179/15 BA
[51] Int. Cl. .............................................. H04j 3/06
[58] Field of Search ....... 179/15 BS, 15 AT, 15 BV, 179/15 AF

[56] References Cited
UNITED STATES PATENTS

| | | | |
|---|---|---|---|
| 3,591,720 | 7/1971 | Othmer | 179/15 BS |
| 3,641,274 | 2/1972 | Sasaki | 179/15 BS |
| 3,705,266 | 12/1972 | Philip | 179/15 AT |

*Primary Examiner*—David L. Stewart
*Attorney, Agent, or Firm*—Abraham A. Saffitz

[57] ABSTRACT

A facility for restoring the phase of data envelopes having a number *m* of bits and starting with an envelope framing bit, the envelopes forming a flow of bits including transmitted envelope framing bits and being passed through a time-division switching network designed to switch *n*-bit PCM words located in the time slots of consecutive frames of a time division switching network wherein, *m* being greater than *n*. It comprises means for serially receiving the flow of bits formed by the envelopes and means for generating a multiframe signal having a length equal to a whole number of envelopes and to a whole number of frames, composed of local envelope framing bits distributed from *m* to *m* in the length of the multiframe signal. The transmitted envelope framing bits contained in the flow of bits and the local envelope framing bits are compared in a synchronization search device which steps on and delays by one bit interval the transmitted framing bits with respect to the local framing bits as long as synchronism is not achieved. Extra delays of multiples of ($m-n$) bit intervals are selectively applied to the flow of bits for taking account of the frame jumps due to the passage of the words through the switching network.

3 Claims, 4 Drawing Figures

DEVICE FOR ALIGNING DATA ENVELOPE FORMATS TO PCM WORD FORMATS

This invention relates generally to time division switching networks, more particularly of the kind simultaneously transmitted PCM coded words in time slots and digital data in envelope form. More particularly, the invention relates to a system for restoring the digital data envelopes at the input to a data switching network in the case in which the data envelopes have a greater number of bits than the PCM words and have passed previously through time division telephone switching networks.

The PCM words in the time slots of time division telephone switching systems have a definite number of bits, e.g., eight. Such telephone switching systems can also readily transmit data grouped in envelopes of PCM compatible characteristics (transmission rate, length of bits) in cases in which the number of bits of the envelope is equal to the number of bits of the word. However, difficulties arise if the envelopes contain a number of bits different from the bit number of the PCM words.

If the digital transmission standards recommended by the European Postal and Telecommunications Conference (CEPT) and the signalling code of the American Standard Code for Information Interchange (ASCII) approved by the International Telegraph and Telephone Consultative Committee (CCITT) are used, PCM coded words are octets or bytes of $n$=8 bits and envelope capacity is $m$=10 bits. Of these ten bits one is the framing bit for identifying the start of an envelope and another is the status bit for distinguishing a data envelope from a signalling envelope, while the other eight bits either are actual digital data or carry signalling information.

It is an object of the invention to make time division switching networks of use for switching data envelopes having a bit number different from the bit number per time slot.

It is another object of the invention to make it possible to transmit signalling carrying envelopes in the flow of bits and to separate these signalling carrying envelopes from the flow of bits without restoring the framing of the envelopes relatively to the PCM frame at the switching network input.

If a recurrent $n$-bit time slot is allotted to the transmission of $m$-bit envelopes and if $m$ is assumed to be greater than $n$, the first $n$ bits of the first envelope from 0 to $(n-1)$ inclusive will be transmitted in the allotted time slot of the first frame. The second allotted time slot of the second frame will contain $(m-n)$ bits from $n$ to $(m-1)$ inclusive of the first envelope and $(2n-m)$ bits from 0 to $(2n-m-1)$ inclusive of the second envelope.

Clearly, therefore, if $e_k$ denotes the first bit or framing bit of the envelope rank of $k$, $e_0$ coincides with the zero rank bit $\tau_{0,0}$ of the allotted time slot of the first frame, $e_1$ coincides with the bit of rank $(m-n)$, $\tau_{(m-n),1}$ of the second frame and $e_k$ coincides with the bit of rank $k(m-n)$, $\tau_{k(m-n),k}$ of the $(k+1)$th frame provided that $k(m-n) \leq n$.

More particularly, if:

| | |
|---|---|
| $T_0, T_1, \ldots T_j, \ldots T_{N-1}$ | denote the frames and T their duration; |
| $E_0, E_1, \ldots E_k, \ldots E_{M-1}$ | denote the envelopes and E their duration or length; |

$\tau$ denotes the duration or length of a multi-frame comprising an integral number of frames and an integral number of envelopes;

$i$ denotes the rank of a bit in an octet;

$j$ denotes the rank of a frame in the nulti-frame;

$\tau_{i,j}$ denotes the bit of rank $i$ in the allotted slot of the frame $T_j$;

$e_k$ denotes the framing bit of the envelope of rank $k$;

$n$ denotes the number of bits per time slot; and $m$ denotes the number of bits per envelope, the length of the multi-frame is chosen to be:

$$\tau = NT = ME$$

where N is equal to the lowest common multiple of $m$ and $n$ divided by $n$ and M is equal to the lowest common multiple of $m$ and n divided by $m$:

$$M = \frac{\text{lowest common multiple of m and n}}{m}$$

$$N = \frac{\text{lowest common multiple of m and n}}{n}$$

If the framing bit $e_0$ coincides with the bit $\tau_{x,0}$ occupying rank $i = x$ in the allotted slot of frame $T_0$, the framing bit $e_k$ will coincide with the bit $\tau_{i,j}$ taking up the rank $i$ in the allotted slot of the frame $T_j$ with:

$$i = x + k(m-n) - Rn \quad (1)$$

$$j = (k+R) - R'm \quad (2)$$

in which R denotes the quotient of $x + k(m-n)$ by $n$ and R' is the quotient of $(k+R)$ by $m$. In other words, $i$ is the modulo $n$ sum of $x$ and $k(m-n)$ and $j$ is the modulo $m$ sum of $k$ and R.

Example 1

Assuming that $m - 9$, $n = 7$ and $x = 3$, the lowest common multiple of 9 and 7 is 63, and so $$M = \frac{63}{9} = 7 \quad \text{and} \quad N = \frac{63}{7} = 9$$

$i$ can be anything from 0 to 6 since $n = 7$;

$j$ varies from 0 to N−1 = 8; and $k$ varies from 0 to M−1 = 6.

The following table fives values of $i$ and $j$ for values of $k$ from 0 to 6.

| $k$ | $i$ | R | $j$ | R' | $i,j$ |
|---|---|---|---|---|---|
| 0 | 3 | 0 | 0 | 0 | 3,0 |
| 1 | 5 | 0 | 1 | 0 | 5,1 |
| 2 | 0 | 1 | 3 | 0 | 0,3 |
| 3 | 2 | 1 | 4 | 0 | 2,4 |
| 4 | 4 | 1 | 5 | 0 | 4,5 |
| 5 | 6 | 1 | 6 | 0 | 6,6 |
| M−1 = 6 | 1 | 2 | 8 | 0 | 1,8 |
| M = 7 | 3 | 2 | 0 | 1 | 3,0 |
| M+1 = 8 | 5 | 2 | 1 | 1 | 5,1 |

Example 2

Assuming that $$m = 10 \quad n = 8 \quad \text{and } x = 0,$$

the lowest common multiple of 10 and 8 is 40, and so $$M = 4 \text{ and } N = 5$$

Therefore:

$i$ can vary from 0 to 7, since $n = 8$;
$j$ varies from 0 to $N-1 = 4$; and
$k$ varies from 0 to $m-1 = 3$.

The multiframe $\tau$ contains five frames $T_0$ to $T_4$ and four envelopes $E_0$ to $E_3$. The envelope framing bits $e_0$, $e_1$, $e_2$, $e_3$ coincide with the bits $\tau_{0,0}$ $\tau_{2,1}$ $\tau_{4,2}$ $\tau_{6,3}$ of the time slots. Frame $T_4$ has no framing bit. The following Table gives $(i, j)$ for two whole multiframes.

| $k$ | $i$ | R | $j$ | R' | $i,j$ |
|---|---|---|---|---|---|
| 0 | 0 | 0 | 0 | 0 | 0,0 |
| 1 | 2 | 0 | 1 | 0 | 2,1 |
| 2 | 4 | 0 | 2 | 0 | 4,2 |
| $M-1 = 3$ | 6 | 0 | 3 | 0 | 6,3 |
| $M = 4$ | 0 | 1 | 5 | 0 | 0,5 = 0,0 |
| $M+1 = 5$ | 2 | 1 | 6 | 0 | 2,6 = 2,1 |
| 6 | 4 | 1 | 7 | 0 | 4,7 = 4,2 |
| 7 | 6 | 1 | 8 | 0 | 6,8 = 6,3 |
| 8 | 0 | 2 | 0 | 1 | 0,0 |

In general, the phasing-up or alignment of envelopes is a matter of comparing the bits of the sequence of received words, some of such bits, occurring in every tenth position, being the envelope framing bits, with local framing bits suitably spaced apart in a multiframe signal. The envelopes are in alignment when the transmitted envelope framing bits coincide with the local envelope framing bits.

However, in the time division telephone switching art the passage of a PCM word through a switching network may introduce between the frame containing this word at the switching network input and the frame containing the same word at the network output a shift equal to a whole number of frames comprised between 0 and the number of time division switching stages in the switching network. This frame shift must be allowed for; in time division switching systems such shift is known by the switching network control unit. Means are therefore provided for delaying the received octets by a number of bits which depends upon the frame shift as will be explained in the following.

The invention will now be described in detail with reference to the accompanying drawings wherein.

Figure 1:
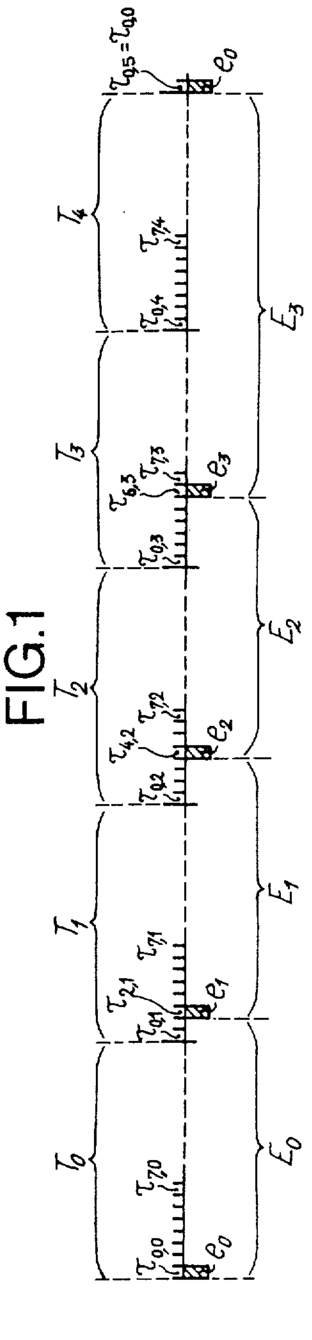
FIG. 1 is a diagram showing how envelopes are formed from words.

FIG. 1 shows the make-up of a multi-frame in the case of example 2. The frames $T_0$ to $T_4$ each of 125 $\mu s$ length form a 625 $\mu s$ multi-frame $\tau$, and the allotted slot in each of the frames $T_0$ to $T_4$ is the first time slot. Also visible are envelope framing bits $e_0$, $e_1$, $e_2$, $e_3$ coinciding with the frame bits $\tau_{0,0}$, $\tau_{2,1}$, $\tau_{4,2}$, $\tau_{6,3}$. There is no envelope framing bit in frame $T_4$.

Figure 2:
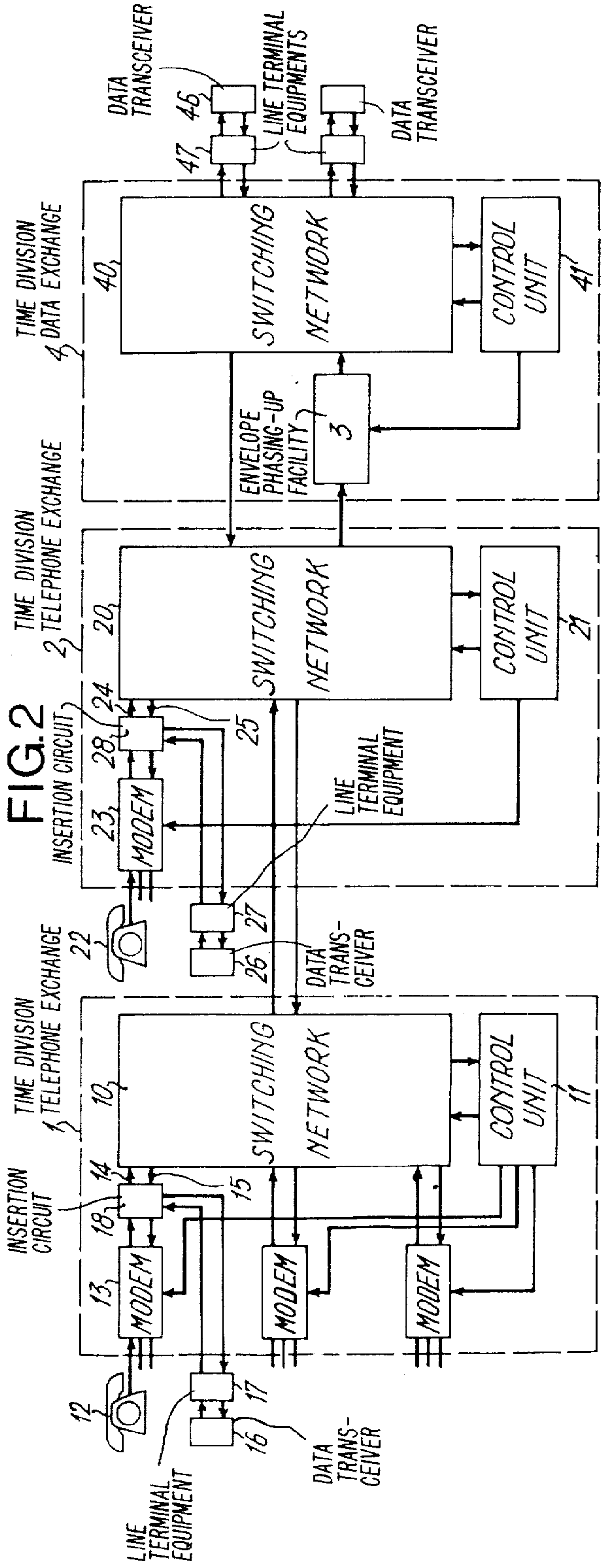
FIG. 2 shows a plurality of time division cascade-connected switching exchanges and a time division data-switching exchange comprising an envelope phasing-up system according to the invention.

In FIG. 2, there can be seen two time division telephone exchanges 1, 2 and one time division data exchange 4. Each exchange 1, 2, 4, comprises a switching network 10, 20, 40 and a control unit 11, 21, 41. The switching networks 10, 20, 40 are designed to switch eight-bit words. Subscribers' telephone stations 12, 22 are connected to modems 13, 23 which are connected to the switching networks 10, 20 by incoming group highways 14, 24 and outgoing group highways 15, 25.

Data transceivers 16, 26 are connected to line terminal facilities 17, 27 which are connected to insertion circuits 18, 28 disposed on the incoming group highways 14, 24 and outgoing group highways 15, 25.

The data-switching network 40 is connected to a line terminal facility 47 which is connected to a data transceiver 46. Disposed on the incoming group highway to network 40 is an envelope phasing-up facility 3 which forms the subject of the invention and which will be described with reference to FIG. 3.

Figure 3:
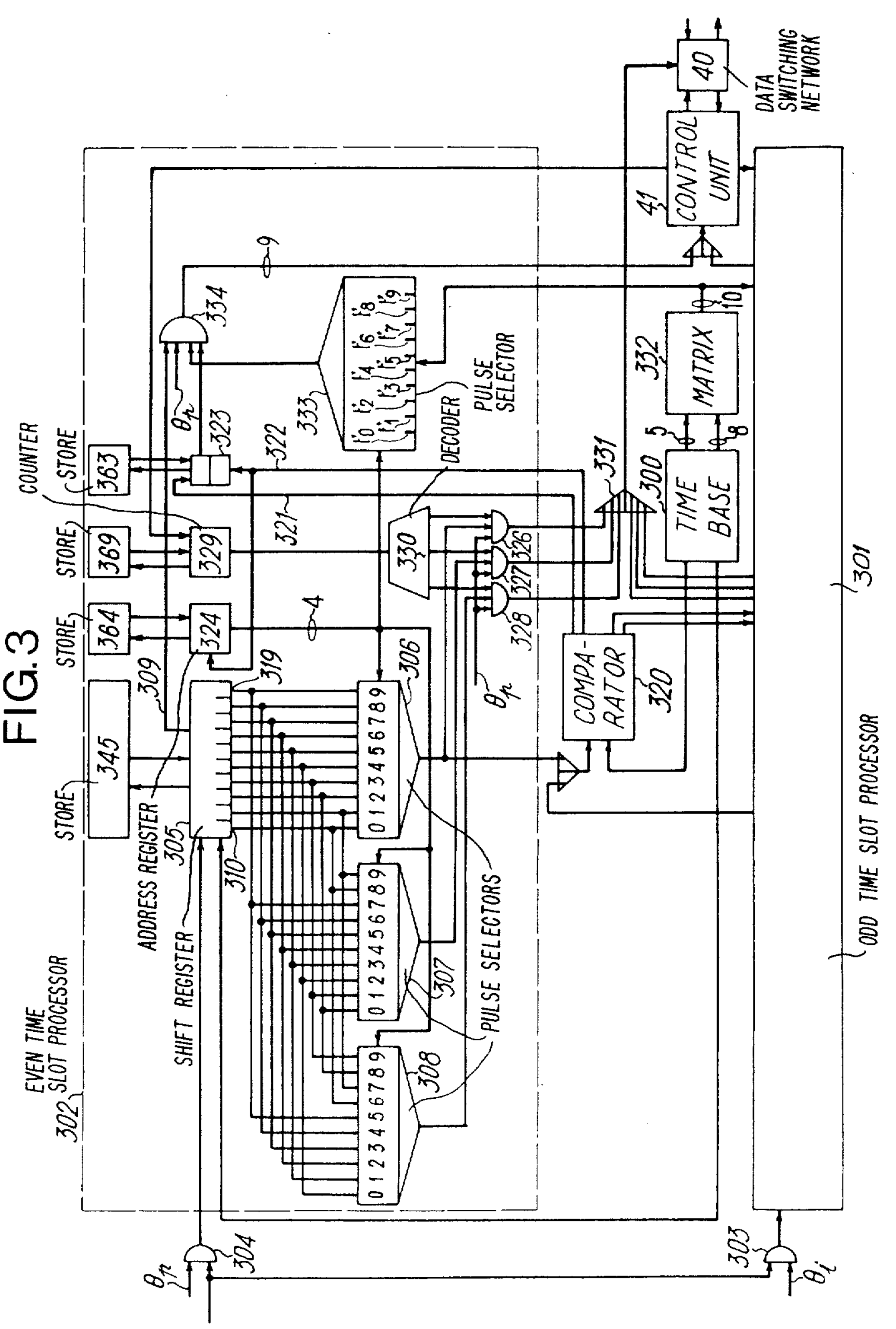
FIG. 3 is a diagram of the envelope phasing-up system.

The input of facility 3 is connected to two AND-gates 303, 304 which are opened by a time base 300 at the time slot frequency of 1/3.9 $\mu s$ and in opposition; consequently, the words of the odd time slots $\theta_1$,$\theta_3$, and so on are received in processor 301 of facililty 3 and the words of the even time slots $\theta_0$,$\theta_2$ and so on are received in processor 302 of facility 3. The two processors 301 and 302 are controlled by the same time base 300. In FIG. 3, $\theta_i$ denotes odd time slots and $\theta_p$ denotes even time slots.

The output of AND-gate 304 is connected to a ten-stage shift register 305 controlled by time base 300 at the bit frequency of 1/0.5 $\mu s$. Register 305 receives the PCM words in series and distributes in series the words received in series to one of ten outputs numbered 310 to 319 with a delay varying from zero bit to nine bits respectively; also, at times determined by an adressing means, register 305 outputs a nine-bit word in parallel to wires 309.

Shift register 305 is connected in parallel to three pulse selectors 306–308 which are known in the art and are embodied by a register associated with an OR-gate. The register receives series bits at each of its inputs and also receives from an address register the address of one of its outputs. The outputs are parallel-connected to an OR-gate and the selector outputs in series at the single output of the OR-gate the bits received in series at the input corresponding to the marked register output.

The inputs of selectors 306–308 are connected in parallel to the outputs of shift register 305 so that the order of the outputs 0–9 in register 305 and of the inputs 0–9 in the register of the signal selector 306 is the same, but that outputs 0–9 in register 305 are respectively connected to inputs 8, 9, 0, 1, . . . 7 in the register of selector 307 and to inputs 6, 7, 8, 9, 0, 1, . . . 5 in the register of selector 308. Accordingly, there is a two-bit shift between the inputs of selectors 306, 307, 308 connected to the same output of shift register 305.

The address is sent to the selectors 306–308 by an address register 324.

A comparator 320 receives the local envelope framing bits of FIG. 1 from the time base 300, plus the output signal selected by selector 306, and checks that the envelope framing bits received from selector 306 definitely coincide with the local envelope framing bits of the multi-frame signal. At each positive comparison it outputs an output signal to wire 321 which brings a bistable 323 into the one state, whereas at each negative comparison the comparator 320 outputs a signal to wire 322 which puts bistable 323 in the zero state and steps on the address register 324 one unit. Address register 324 therefore changes the sequence of the bits selected by the respective selectors 306–308 — i.e., register 324 changes the lag of the train of bits issuing from selector 306 relatively to the train of bits entering the shift register 305.

The units 306, 320, 324 and 323 together form a sync search system which operates at every even slot to search for the envelope framing bit therein.

It will be assumed that the allotted slot is the even slot $\theta_0$. The comparator receives from the time base bit timing pulses $t_0$ to $t_7$ and envelope framing signals $e_0$ to $e_3$ coinciding with $t_0$ of $\theta_0$ in $T_0$, with $t_2$ of $\theta_0$ in $T_1$, with $t_4$ of $\theta_0$ in $T_2$ and with $t_6$ of $\theta_0$ in $T_3$. During slot $\theta_0$ of $T_0$ the shift register 305 is assumed to receive the bits $\tau_{2,0}$ to $\tau_{1,1}$ of a first word coinciding with the pulses $t_0$ to $t_7$ respectively. Clearly, due to a loss of sync it is $\tau_{2,0}$ and not $\tau_{0,0}$ which coincides with $t_0$.

Table I shows the bits which are applied to the inputs 0–9 of pulse selector 306 at times from $t_0$ of the first frame $T_0$ which coincides with $e_0$ to $t_2$ of the second frame $T_1$ which coincides with $e_1$.

TABLE I

| envelope framing bit | clock | Number of input of selector 306: 0 | 1 | 2 | 3 | 4 | 5 | 6 | 7 | 8 | 9 |
|---|---|---|---|---|---|---|---|---|---|---|---|
| $e_0$ | $t_0$ | $\tau_{2,0}$ | | | | | | | | | |
| | $t_1$ | $\tau_{3,0}$ | $\tau_{2,0}$ | | | | | | | | |
| | $t_2$ | $\tau_{4,0}$ | $\tau_{3,0}$ | $\tau_{2,0}$ | | | | | | | |
| | $t_3$ | $\tau_{5,0}$ | $\tau_{4,0}$ | $\tau_{3,0}$ | $\tau_{2,0}$ | | | | | | |
| | $t_4$ | $\tau_{6,0}$ | $\tau_{5,0}$ | $\tau_{4,0}$ | $\tau_{3,0}$ | $\tau_{2,0}$ | | | | | |
| | $t_5$ | $\tau_{7,0}$ | $\tau_{6,0}$ | $\tau_{5,0}$ | $\tau_{4,0}$ | $\tau_{3,0}$ | $\tau_{2,0}$ | | | | |
| | $t_6$ | $\tau_{0,1}$ | $\tau_{7,0}$ | $\tau_{6,0}$ | $\tau_{5,0}$ | $\tau_{4,0}$ | $\tau_{3,0}$ | $\tau_{2,0}$ | | | |
| | $t_7$ | $\tau_{1,1}$ | $\tau_{0,1}$ | $\tau_{7,0}$ | $\tau_{6,0}$ | $\tau_{5,0}$ | $\tau_{4,0}$ | $\tau_{3,0}$ | $\tau_{2,0}$ | | |
| | $t_0$ | $\tau_{2,1}$ | $\tau_{1,1}$ | $\tau_{0,1}$ | $\tau_{7,0}$ | $\tau_{6,0}$ | $\tau_{5,0}$ | $\tau_{4,0}$ | $\tau_{3,0}$ | $\tau_{2,0}$ | |
| | $t_1$ | $\tau_{3,1}$ | $\tau_{2,1}$ | $\tau_{1,1}$ | $\tau_{0,1}$ | $\tau_{7,0}$ | $\tau_{6,0}$ | $\tau_{5,0}$ | $\tau_{4,0}$ | $\tau_{3,0}$ | $\tau_{2,0}$ |
| $e_1$ | $t_2$ | $\tau_{4,1}$ | $\tau_{3,1}$ | $\tau_{2,1}$ | $\tau_{1,1}$ | $\tau_{0,1}$ | $\tau_{7,0}$ | $\tau_{6,0}$ | $\tau_{5,0}$ | $\tau_{4,0}$ | $\tau_{3,0}$ |

Table II shows the bits which are contained in the stages 0–9 of pulse selector 306 at the times $e_0, e_1, e_2, e_3, e_0, e_1, e_2, e_3, e_0, e_1$ of the frames $T_0, T_1, T_2, T_3, T_5, T_6, T_7, T_8, T_{10}, T_{11}$. The first line of Table II is the same as the first line of Table I and the second line of Table II is the same as the last line of Table I. The address register 324 steps on one unit between two consecutive bits unless the two bits compared are the local framing bit and the transmitted framing bit. In each envelope, that bit of the envelope which is compared with the local framing bit of the first column of the table is underlined.

As Table II shows, at the third comparison when the address register 324 is at address 2, the bit $\tau_{4,2}$ which is a transmitted framing bit (underlined) is compared with the local framing bit $e_2$. The address register 324 then stops and, as can be seen in Table II, the bit train issuing at output 2 of selector 306 definitely has its framing bits transmitted in coincidence with the local framing bits.

TABLE II

| envelope framing bit | clock | address | Number of inputs of selector 306: 0 | 1 | 2 | 3 | 4 | 5 | 6 | 7 | 8 | 9 |
|---|---|---|---|---|---|---|---|---|---|---|---|---|
| $e_0$ | $t_0$ | 0 | $\tau_{2,0}$ | | | | | | | | | |
| $e_1$ | $t_2$ | 1 | $\tau_{4,1}$ | $\tau_{3,1}$ | $\tau_{2,1}$ | $\tau_{1,1}$ | $\tau_{0,1}$ | $\tau_{7,0}$ | $\tau_{6,0}$ | $\tau_{5,0}$ | $\tau_{4,0}$ | $\tau_{3,0}$ |
| $e_2$ | $t_4$ | 2 | $\tau_{6,2}$ | $\tau_{5,2}$ | $\tau_{4,2}$ | $\tau_{3,2}$ | $\tau_{2,2}$ | $\tau_{1,2}$ | $\tau_{0,2}$ | $\tau_{7,1}$ | $\tau_{6,1}$ | $\tau_{5,1}$ |
| $e_3$ | $t_6$ | 3 | $\tau_{0,4}$ | $\tau_{7,3}$ | $\tau_{6,3}$ | $\tau_{5,3}$ | $\tau_{4,3}$ | $\tau_{3,3}$ | $\tau_{2,3}$ | $\tau_{1,3}$ | $\tau_{0,3}$ | $\tau_{7,2}$ |
| $e_0$ | $t_0$ | 4 | $\tau_{2,5}$ | $\tau_{1,5}$ | $\tau_{0,5}$ | $\tau_{7,4}$ | $\tau_{6,4}$ | $\tau_{5,4}$ | $\tau_{4,4}$ | $\tau_{3,4}$ | $\tau_{2,4}$ | $\tau_{1,4}$ |
| $e_1$ | $t_2$ | 5 | $\tau_{4,6}$ | $\tau_{3,6}$ | $\tau_{2,6}$ | $\tau_{1,6}$ | $\tau_{0,6}$ | $\tau_{7,5}$ | $\tau_{6,5}$ | $\tau_{5,5}$ | $\tau_{4,5}$ | $\tau_{3,5}$ |
| $e_2$ | $t_4$ | 6 | $\tau_{6,7}$ | $\tau_{5,7}$ | $\tau_{4,7}$ | $\tau_{3,7}$ | $\tau_{2,7}$ | $\tau_{1,7}$ | $\tau_{0,7}$ | $\tau_{7,6}$ | $\tau_{6,6}$ | $\tau_{5,6}$ |
| $e_3$ | $t_6$ | 7 | $\tau_{0,1}$ | $\tau_{7,8}$ | $\tau_{6,8}$ | $\tau_{5,8}$ | $\tau_{4,8}$ | $\tau_{3,8}$ | $\tau_{2,8}$ | $\tau_{1,8}$ | $\tau_{0,8}$ | $\tau_{7,7}$ |
| $e_0$ | $t_0$ | 8 | $\tau_{2,2}$ | $\tau_{1,2}$ | $\tau_{0,2}$ | $\tau_{7,1}$ | $\tau_{6,1}$ | $\tau_{5,1}$ | $\tau_{4,1}$ | $\tau_{3,1}$ | $\tau_{2,1}$ | $\tau_{1,1}$ |
| $e_1$ | $t_2$ | 9 | $\tau_{4,3}$ | $\tau_{3,3}$ | $\tau_{2,3}$ | $\tau_{1,3}$ | $\tau_{0,3}$ | $\tau_{7,2}$ | $\tau_{6,2}$ | $\tau_{5,2}$ | $\tau_{4,2}$ | $\tau_{3,2}$ |

As stated in the introduction hereof, the passage of an octet through a switching network may introduce between the octet "input" frame and "output" frame a shift equal to a whole number of frames between 0 and the number of time division switching stages in the network. Control unit 41 knows this shift and outputs a corresponding signal to a binary counter 329 associated with a decoder 330 which selectively opens one of AND-gates 326–328 connecting the selectors 306–308 respectively to the input register of the data-switching network 40 by way of an OR-gate 331.

Clearly, the AND-gates 326–328 correspond to the respective cases of the octet experiencing a delay of 0, 1 or 2 frames in its passage through the switching network. Of course, the description here is merely of a two-stage switching network since the maximal possible time lag is assumed to be of two frames, but the same reasoning can be extended to cover any number of stages.

As a result of the frame shift introduced by the network, if the word is to appear at the switching network output in phase with the envelope frame, it must be offset by 0 or 2 or 4 positions at the input. This point will be explained in detail hereinafter on the assumption of a two-frame shift and with reference to Table III.

On the same hypotheses as previously, viz., that during slot $\theta_0$ of $T_0$ the shift register 305 receives the PCM word formed by the bits $\tau_{2,0}$ to $\tau_{1,1}$ coinciding with the timing pulses $t_0$ to $t_7$ respectively, it has been seen that the selected stage (input and output) of selector 306 was stage No. 2, so that $\tau_{2,1}$ is phased-up with $t_2$ of frame $T_1$ (see Table III, input No. 2, selector 306 where it is shown that $\tau_{2,0}$ is vertically aligned with ($t_2$,$\theta_0$,$T_1$).

If read-out and write-in in the switching network buf-

Of course, four units would be added to the address of the selector 306, but it is preferable to retain such address and to have three different selectors 306–308 available which receive the same addresses and to connect their inputs to the outputs of shift register 305 to achieve the required shift. As will be seen hereinafter, the required shift is a four bit lag interval between selectors 306 and 308 and a two bit lag interval between selectors 306 and 307. It can be seen in Table III that a given bit, say $\tau_{2,1}$, is vertically aligned with ($t_2$, $\theta_0$, $T_1$) at input No. 2 of selector 306 and with ($t_6$, $\theta_0$, $T_1$) at input No. 2 of selector 308.

TABLE III

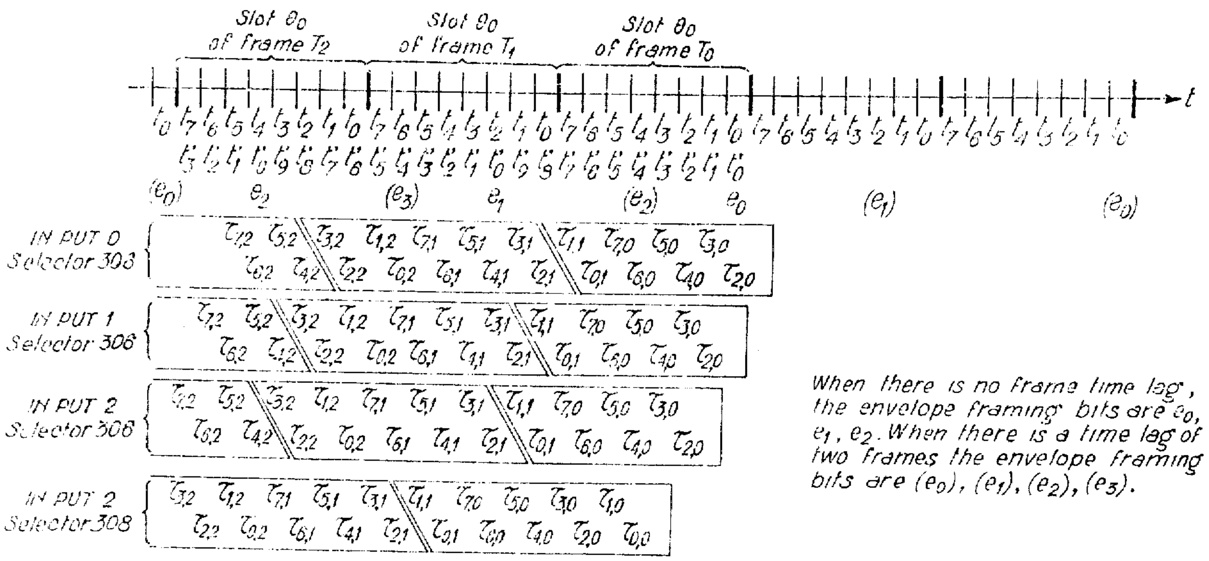

fer stores take place during the same frame, the envelope framing bit $\tau_{2,1}$ remains completely in phase with the local multi-frame bit $e_1$.

If, however, reading-out from the switching network stores occurs in the frame following the frame of write-in into the stores, the received framing bit slips into a lead of 2 positions with respect to the local framing bit. In fact, during frame $T_1$ the local framing bit output by the exchange time base is $e_1$ in phase with ($t_2$, $T_1$). During frame $T_2$, the local framing is $e_2$ in phase with ($t_4$, $T_2$) which has undergone a 10-bit shift. Now, an one-frame shift corresponds to a duration of eight bits and $\tau_{2,1}$ will be in phase with ($t_2$, $T_2$) again at its exit from the network. For $\tau_{2,1}$ to be in phase with ($t_4$, $T_2$) when leaving the network, it should have been written in into the store at ($t_4$, $T_1$) and thus delayed by 2 bits by selecting output No. 4 of shift register 305 instead of output No. 2.

If now reading-out occurs two frames after writing-in, an extra lead-shift of two bits of the receiving framing bit with respect to the local framing bit will occur and $\tau_{2,1}$ would have to be written into the network stores in phase with ($t_6$, $T_1$).

Up to now, one has explained how a pattern of local envelope framing bits is brought into coincidence by a sync search system with a pattern of received envelope framing bits. The pattern of local envelope framing bits is an unvarying pattern and it is periodic at the multi-frame period. On the contrary, the spacings between the received envelope framing bits vary according to the number of frame jumps experienced by the PCM words in their passage through the switching networks inserted in the data link.

When synchronization has been achieved, the envelopes are available at the proper output of one of the selectors 306–308 and are serially applied to data switching network 40. It is to be noticed that, except in the case where output No. 0 of selector 306 is selected, the synchronization operation introduces a certain time lag which is without inconvenience for data envelopes but is objectionable for signalling carrying envelopes.

For processing the signalling carrying envelopes, instead of the transmitted envelope framing bits being aligned on the local envelope framing bits which are located relatively to the slot timing pulses $t_0$ to $t_7$, the same operation is performed by locating the local envelope framing bits relatively to envelope timing pulses $t_0'$ to $t_9'$. The correspondence between, on the one hand, the $T_j$ and the $t_0$ to $t_7$ and, on the other hand, the $t_0'$ to $t_9'$ is given in the following Table IV.

TABLE IV

| | $t_0'$ | $t_1'$ | $t_2'$ | $t_3'$ | $t_4'$ | $t_5'$ | $t_6'$ | $t_7'$ | $t_8'$ | $t_9'$ |
|---|---|---|---|---|---|---|---|---|---|---|
| $T_0$ | $t_0$ | $t_1$ | $t_2$ | $t_3$ | $t_4$ | $t_5$ | $t_6$ | $t_7$ | — | — |
| $T_1$ | $t_2$ | $t_3$ | $t_4$ | $t_5$ | $t_6$ | $t_7$ | — | — | $t_0$ | $t_1$ |
| $T_2$ | $t_4$ | $t_5$ | $t_6$ | $t_7$ | — | — | $t_0$ | $t_1$ | $t_2$ | $t_3$ |
| $T_3$ | $t_6$ | $t_7$ | — | — | $t_0$ | $t_1$ | $t_2$ | $t_3$ | $t_4$ | $t_5$ |
| $T_4$ | — | — | $t_0$ | $t_1$ | $t_2$ | $t_3$ | $t_4$ | $t_5$ | $t_6$ | $t_7$ |

Figure 4:
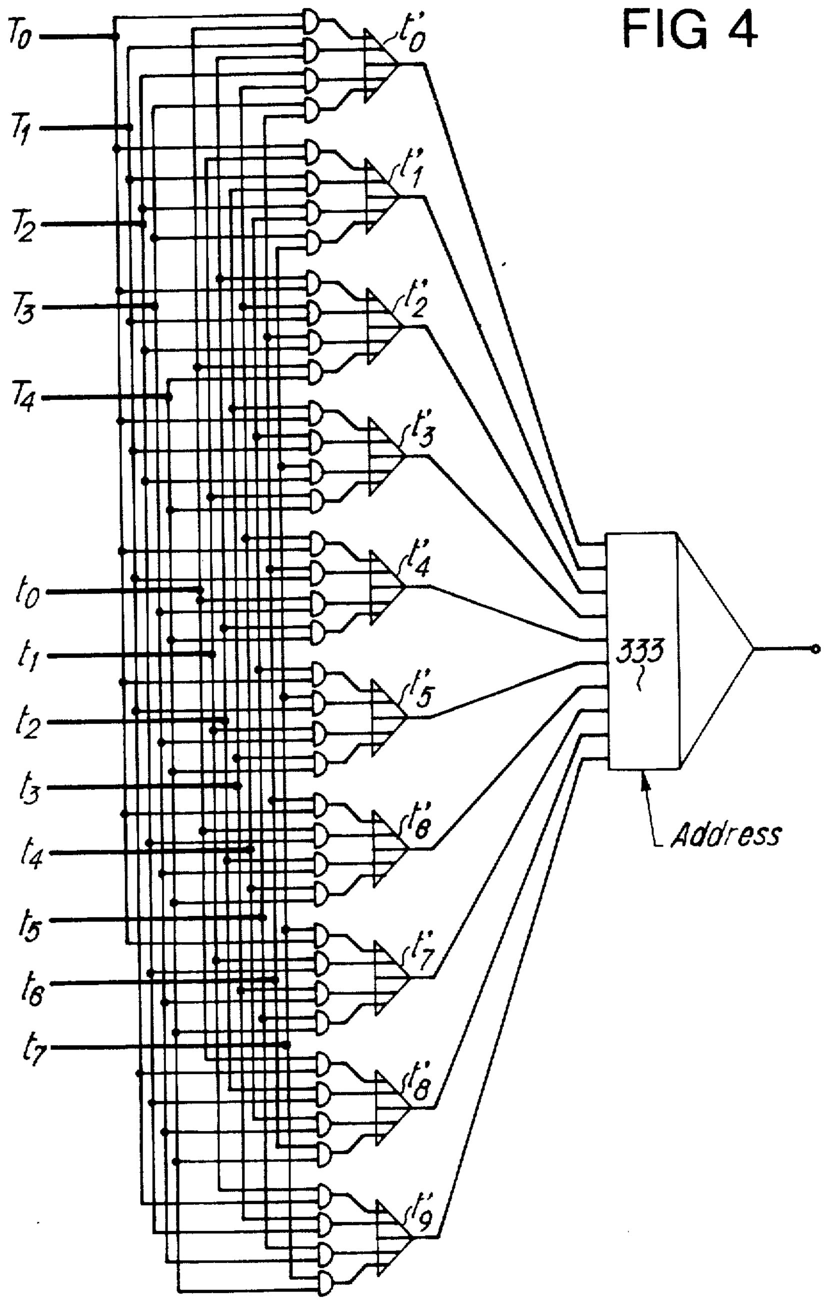
FIG. 4 shows a signal processing matrix for converting timing pulses corresponding to the octet format into timing pulses corresponding to the envelope format.

The $t'$ 's are prepared from the T's and from the $t$'s in combining matrix 332 shown in FIG. 4. This matrix receives the 125 $\mu$s frame signals $T_0$ to $T_4$ and the slot timing signals $t_0$ to $t_7$ from the time base 300 and outputs signals $t_0'$ to $t_9'$ to a pulse selector 333 controlled by the same address register 324 as the selectors 306–308.

If the envelope timing pulse with which the bit $\tau_{i,j}$ of envelope $k$ coincides is called $t_p'$, the following relationship holds good between $p$, $i$, $j$ and $k$:

$$i + 8j = 10k + p \tag{3}$$

when synchronization has been achieved. Referring to Table III, for instance, the bit $\tau_{3,2}$ ($i = 3$, $j = 2$) of the second ($k = 1$) envelope coincided with $t_9'$ ($p = 9$). Before synchronization has been achieved, as is the case in register 305, $p$ must be replaced by $(p - A)$, A denoting the address of the address register 324. The formula (3) becomes:

$$i + 8j = 10k + p - A \tag{4}$$

Since the envelopes must be read at the end of the time $t_9'$, $p$ must be made equal to 9 to have the read-out time of the complete envelope in the register 305. Formula (4) becomes:

$$i + 8j = 10k + 9 - A \tag{5}$$

which means that the read-out time is $t_{(9-A)}'$.

Reverting to the example previously given in which the first bit received is $\tau_{2,0}$ and coincides with the envelope timing pulse $t_0'$, the read-out time is $t_{(9-2)}' = t_7'$. The envelope timing pulses $T_0'–t_9'$ from matrix 332 are applied at the addresses 9– 0 respectively to selector 333 so that what correspond to address A of address register 324 is not $t_A'$ bit $t_{(9-A)}'$. The envelope is therefore definitely read out at the time when it is complete in register 305. Since the envelope framing bit is of no use at this time, it has been assumed that only 9 bits, the status bit and the eight signalling bits, were read out, but the ten bits could of course be read out.

The read-out envelopes are applied to the control unit 41 through gate 334 whose other inputs are connected to bistable 323 and to the time base from which they receive the even-slot signals. AND-gates which are similar to the gate 334 and which are disposed in part 301 of the system would receive the odd-slot signals.

As has been stated, the units 305, 324, 329 and 323 are common to all the slots of a frame. At the passage from any even slot to the next even slot, the contents of the units 305, 324, 329 and 323 are stored in stores 345, 364, 369, 363 respectively. All the latter stores have a capacity of sixteen words, the words of store 345 containing 10 bits, the words of store 364 containing four bits, the words of store 369 containing two bits and the words of store 363 containing 1 bit.

What I claim is:

1. A device for phasing up data envelopes containing a number $m$ of bits and starting with an envelope framing bit, the envelopes forming a flow of bits including transmitted envelope framing bits and being passed through a time division switching network adapted to switch $n$-bit PCM words transmitted in time slots of the consecutive frames of said time division switching network, the number $m$ of bits per envelope being greater than the number $n$ of bits per word and said switching network applying to some of said PCM words a transmission delay equal to an integer number of frames $n_f$, said device comprising means for serially receiving the flow of bits, means for selectively delaying said flow of bits by delays equal to intervals of 1, 2, . . . $(m-1)$ bits, means for generating a multiframe signal of a length equal to whole numbers of frames and of envelopes, composed of local envelope framing bits distributed from $m$ to $m$ in the length of the multiframe signal, means for comparing the flow of bits containing the transmitted envelope framing bits to the local envelope framing bits; means controlled by said comparing means for varying the delay of said delaying means, means for storing the integer number $n_f$ of frames forming the delay experienced by the PCM words passing through the switching network, and means for applying to the flow of bits an extra delay equal to $(m-n)\times n_f$ intervals of bits.

2. A device for phasing up data envelopes as claimed in claim 1 wherein the means for serially receiving the flow of bits and the means for selectively delaying the same consist of a shift register having a single serial input and $m$ serial outputs exhibiting with respect to said input delays equal to 0, 1, 2, . . . $(m-1)$ bit intervals and of means for selecting one of said outputs respectively.

3. A device for phasing up data envelopes containing a number $m$ of bits and starting with an envelope framing bit, the envelopes forming a flow of bits including transmitted envelope framing bits and being passed through a time division switching network adapted to switch $n$-bit PCM words transmitted in time slots of the consecutive frames of said time division switching network, the number $m$ of bits per envelope being greater the the number $n$ of bits per word and said switching network applying to some of said PCM words a transmission delay equal to an integer number of frames $n_f$, said device comprising a $m$-stage shift register having one serial input and $m$ serial outputs, the outgoing flow of bits through respective ones of said outputs exhibiting a delay of 0, 1, 2, . . . $(m-1)$ bit intervals with respect to the incoming flow of bits applied to said input, an address register means for selecting one of said register outputs, means for generating a multiframe signal of a length equal to whole numbers of frames and of envelopes, composed of local envelope framing bits distributed from $m$ to $m$ in the length of the multiframe signal, means for comparing the flow of bits containing the transmitted envelope framing bits to the local envelope framing bits, means controlled by said comparing means for actuating said address register means, means for storing the integer number $n_f$ of frames forming the delay experienced by the PCM words passing through the switching network and a plurality of delay means connected to said selected shift register output, controlled by said storing means and applying to the flow of bits an extra delay equal to $(m-n)\times n_f$ intervals of bits.

* * * * *